Figure 1:
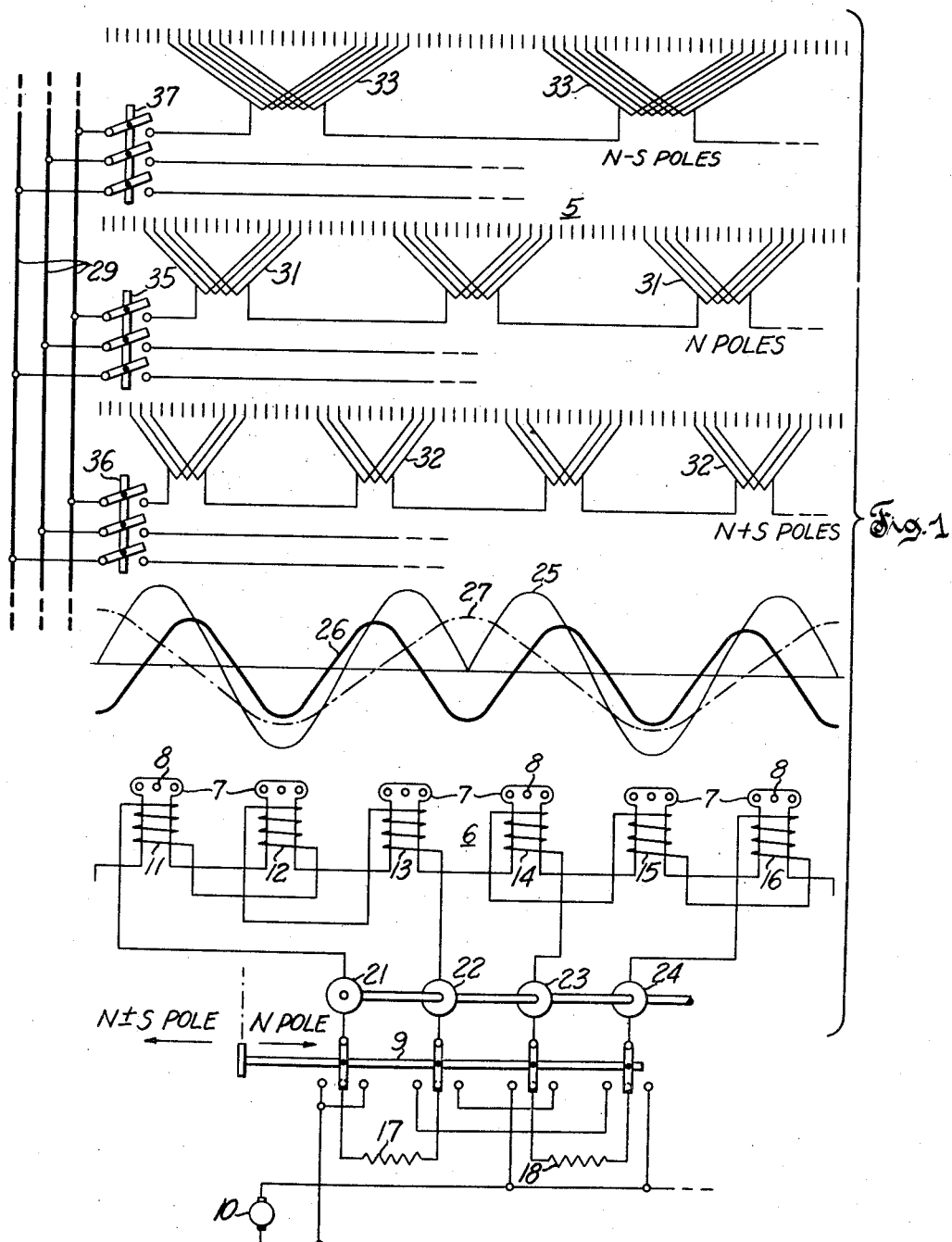

Dec. 6, 1955 W. L. RINGLAND 2,726,361
DYNAMOELECTRIC MACHINE UTILIZING A COMPONENT
OF THE FIELD FLUX WAVE
Filed April 8, 1953 2 Sheets-Sheet 1

Inventor
William L. Ringland

United States Patent Office 2,726,361
Patented Dec. 6, 1955

2,726,361

DYNAMOELECTRIC MACHINE UTILIZING A COMPONENT OF THE FIELD FLUX WAVE

William L. Ringland, West Allis, Wis., assignor to Allis-Chalmers Manufacturing Company, Milwaukee, Wis.

Application April 8, 1953, Serial No. 347,558

10 Claims. (Cl. 318—173)

This invention relates to a dynamoelectric machine of the synchronous type operable at two or more synchronous speeds and more particularly to the circuit arrangement of the field winding of such a machine to provide a speed corresponding to the number of magnetic poles of a component of the field flux.

It is assumed that the standard or normal speed of a synchronous dynamoelectric machine corresponds to the energization of the field coils to excite adjacent polar projections for opposite polarities so that the number of magnetic poles is equal to the number of polar projections.

For speeds other than such standard speed, the field coils heretofore have been energized to form or effect magnetic poles always less in number than the number of coils or polar projections. The alternate speeds of the machine, therefore, were always greater than the standard speed. For such speeds greater than the standard speed, either all the field coils were energized so that alternate pairs of polar projections were excited for one polarity and the other pairs for the other polarity to effect twice normal speed, or some of the field coils were energized while some were not so that the adjacent excited polar projections were of opposite polarities to form a number of magnetic poles equal to the number of excited polar projections but less than the total number of polar projections.

This invention provides field winding arrangements for synchronous speeds less than the normal speed of the machine as well as for synchronous speeds greater than the normal speed. For obtaining such synchronous speeds, the field coils are reconnected and energized to produce a distribution of field flux which has sinusoidal components corresponding both to more and to less than the normal number of magnetic poles. This invention also provides that a greater pull-in torque may be obtained, if desired, at the higher of two operating speeds by connecting the field coils in the normal manner to provide a minimum field reactance at the higher speed.

It is therefore an object of the present invention to provide a synchronous dynamoelectric machine with a field effecting a synchronous speed which is less than the synchronous speed resulting when all polar projections are excited for alternately opposite polarities.

Another object of the invention is to provide a synchronous dynamoelectric machine which utilizes a component of the field flux as determinative of the speed or frequency of the machine.

Another object of the invention is to provide a multiple speed synchronous dynamoelectric machine having a synchronous speed which may be greater or less than the normal speed of the machine for a given field winding arrangement.

Another object of the invention is to provide a multiple speed salient pole synchronous dynamoelectric machine having a field winding arranged to produce a field flux effecting magnetic poles greater in number than the number of salient poles.

Figure 2:
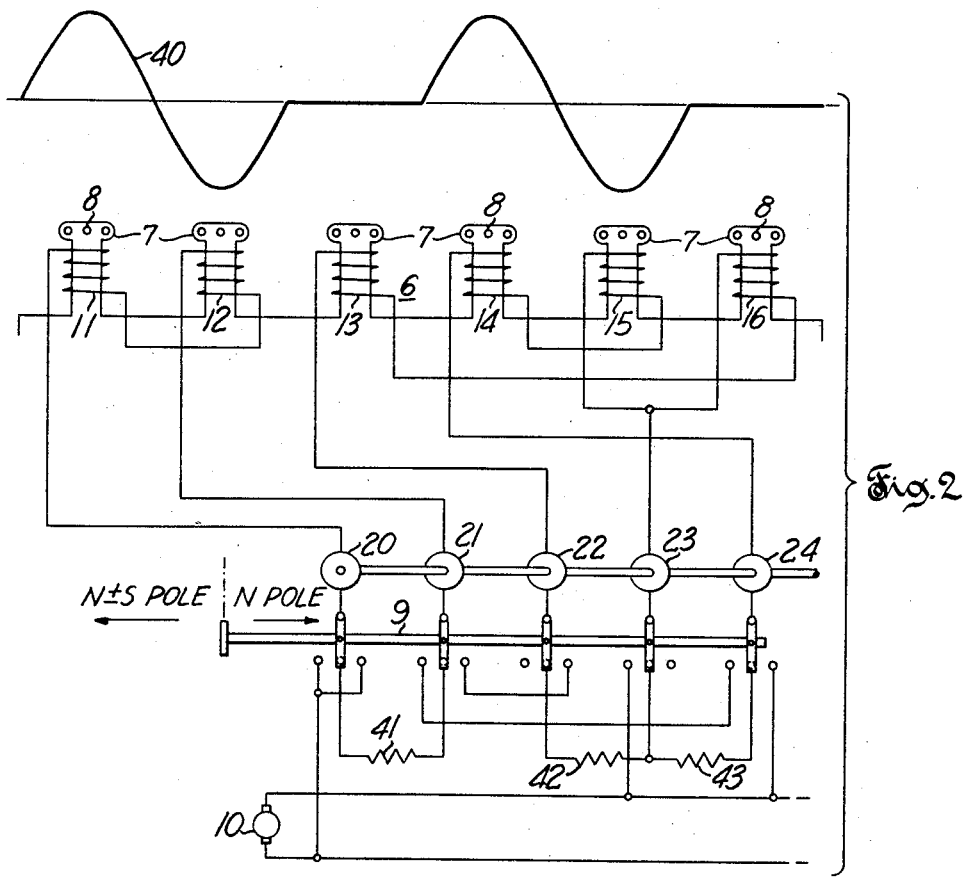

Other objects and advantages will be apparent from the following description taken in connection with the accompanying drawings, in which:

Fig. 1 diagrammatically illustrates a multiple speed synchronous dynamoelectric machine and a control system therefor embodying the present invention; and Fig. 2 diagrammatically illustrates another embodiment of a multiple speed synchronous dynamoelectric machine in accordance with the present invention.

Referring to the drawings, in Fig. 1 a multiple speed synchronous dynamoelectric machine is diagrammatically represented by an armature member 5 and a field member 6 developed in a straight line. The machine may be operated as a synchronous generator or as a synchronous motor and may be assumed to be a synchronous motor of the revolving field type and the armature winding therefore may be referred to as a stator winding. However, the machine could as well comprise a rotating armature and a fixed field pole structure.

The field member comprises polar projections 7 which are N in number where N is an even integer. The N polar projections, here shown as six in number, may be provided as shown with damper windings 8 to enable the machine to start as an induction motor.

Field coils 11 to 16 for the polar projections are shown connected across suitable discharge resistors 17 and 18 in any suitable known manner through slip rings 21 to 24 when starting the machine as a motor. A source of excitation current such as a direct current exciter 10 may be connected to the field winding through a suitable field switch 9 for exciting the polar projections to form a predetermined number of magnetic poles for operating at one of the motor speeds.

The peripheral portion of the rotor defined by the polar projections is divided into S equal groups, where S is an even integer, so that each group includes N/S adjacent polar projections. The field coils for the polar projections of each group are connected in series so that adjacent polar projections of the group are excited for opposite polarities for all speeds of the machine. Thus for one synchronous speed of the motor corresponding to N magnetic poles the field switch 9 is actuated to one position which is to the right in Figs. 1 and 2 for connecting the field coils to the source of excitation current. Coils 11, 12 and 13 of one group are energized so that their polar projections are excited for north, south and north polarities, respectively, and coils 14, 15 and 16 of the adjacent group are energized so their polar projections are excited for south, north and south polarities, respectively, whereby all adjacent polar projections are excited for opposite polarities and the field member forms N magnetic poles.

For the other speeds of the motor the field switch is actuated to another position, to the left in Figs. 1 and 2, for connecting the field coils to the source of excitation current so that the excited polar projections produce the field flux shown by curve 25. Field coils 11, 12 and 13 of the first group of coils are energized so that their polar projections are excited for north, south and north polarities, respectively, which is the same polarity each had for the N pole field connection. Coils 14, 15 and 16 of the adjacent group are energized so that their polar projections are excited for north, south and north polarities, respectively, which is the reverse of the polarity each had for the N pole field connection. With respect to the first or N pole position of the field switch, the field switch in the second position causes the current direction in alternate groups of coils to be reversed, so that the adjacent end coils of adjacent groups excite their adjacent polar projections for the same polarity. When the field switch is actuated to the left, the polarity of each coil of one group with respect to the polarity of the coil similarly disposed in the adjacent group is the same, as shown in Fig. 1, whenever the number of coils per group, N/S, is an odd number, and its polarity is different when N/S is an even number.

For the other speeds of the motor as well as for the normal speed, the field flux is such that division at any point therein divides the wave into symmetrical halves. Such symmetry is necessary to maintain magnetic balance of the rotor so that the rotor is not pulled off center by unbalanced magnetic forces.

It is understood that a recurring wave may be analyzed into the components of a Fourier series in order to determine the harmonics present and their magnitudes. Thus by Fourier analysis it can be shown that the field flux shown by curve 25 has major components having $N+S$ magnetic poles and $N-S$ magnetic poles. For the $N+S$ pole field switch position, the polarities of the polar projections of alternate sections are reversed with respect to their polarities for the N pole field switch position. Such reversal is equivalent to multiplying the original flux wave which is proportional to $$\sin \frac{N}{2}\alpha$$

by a modulating function which has its principal component proportional to $$\sin \frac{S}{2}\alpha$$

The product of these two terms is given by the trigonometric identity $$\sin \frac{N}{2}\alpha \sin \frac{S}{2}\alpha = \tfrac{1}{2} \cos \left(\frac{N-S}{2}\right)\alpha - \tfrac{1}{2} \cos \left(\frac{N-S}{2}\right)\alpha$$

This demonstrates the existence of the flux components, shown by curves 26 and 27, having $N+S$ and $N-S$ magnetic poles, respectively. Their magnitudes can be obtained by well known analytical methods for the determination of the coefficient of any sine or cosine term of the Fourier series. For example, in an analysis of a synchronous dynamoelectric machine having a revolving field of twenty-four salient poles with the field coils arranged in four groups, the peak values of the flux density waves relative to the actual maximum flux density in the air gap, for the $N+S$ pole field switch position, were 66% and 77% for the $N+S$ and $N-S$ components, respectively. For the N pole field switch position the peak value of the N pole field flux wave was 110%. Thus the motor may operate at a synchronous speed corresponding to either $N+S$ or $N-S$ magnetic poles when an armature winding arranged for one of these pole numbers is connected to a suitable source of power.

The armature 5 of the synchronous machine may have a polyphase winding or windings of any number of phases and wound in any suitable known manner and connected to a suitable source 29 for energizing an armature winding at a frequency assumed to be sixty cycles, for example, to form a predetermined number of traveling poles. The armature 5 preferably comprises a three phase Y connected lap winding 31 arranged for N poles for which the machine may normally be connected, and a similar three phase winding 32 arranged for $N+S$ poles. The armature 5 is shown as also provided with similar three phase winding 33 arranged for $N-S$ poles. Only one phase of each of these armature windings is shown, and each winding may be connected to the supply line 29 through one of the switches 35 to 37. The windings 31 to 33 are arranged in the same slots of the armature core so that the windings are substantially noninductive with respect to each other, and of those windings any one may be omitted or any two omitted including the N pole winding.

The synchronous motor may be operated at a normal synchronous speed corresponding to N poles when line switch 35 is closed and the field switch is in the position to the right. For all other synchronous speeds, one of the line switches 36 or 37 is closed and the field switch is in the position to the left, the $N\pm S$ pole position. For synchronous speeds corresponding to $N\pm S$ magnetic poles, the pull-in torque of the machine is reduced because of increased field reactance with respect to the field reactance for the synchronous speed corresponding to N magnetic poles. Therefore, if the greater pull-in torque is required at the higher of two operating speeds, the higher speed would correspond to N magnetic poles, and the lower speed to $N+S$ magnetic poles.

The synchronous dynamoelectric machine may also be operated as a generator. The various pole numbers for the armature and field provide means for maintaining a fixed output frequency when the generator is driven at the various speeds corresponding to the synchronous motor speeds. If the generator is driven at a speed V which is the normal synchronous speed for motor operation the frequency of the generated voltage will be the same as the frequency of the voltage applied when operated as a motor, which frequency was assumed to be sixty cycles. At a lower speed $$V\frac{N}{N+S}$$

corresponding to the $N+S$ pole speed of the motor, the generator voltage when its armature and field are connected for $N+S$ magnetic poles will be sixty cycles and the voltage generated in armature winding 32 due to field flux component 26 is a sixty cycle voltage, while the terminal voltage thereof due to field flux component 27 and any other components of the field flux is negligible. Similarly for generator speed $$V\frac{N}{N-S}$$

higher than normal and corresponding to the $N-S$ pole motor speed, the generator voltage will be sixty cycles when the armature and field windings are connected for $N-S$ magnetic poles. Armature winding 33 has a voltage generated therein due to the $N-S$ pole component of the field flux and its terminal voltage due to other components of the field flux is negligible.

For the $N \pm S$ field pole position the end coil of each group may contribute little to the total generated voltage, and it may therefore be economical to remove these coils from the excitation circuit. This is illustrated in Fig. 2 which shows a field member having six polar projections, as also shown in Fig. 1, and the field coils 11 to 16 are divided into two main groups. One group includes coils 11, 12 and 13 and the other group includes coils 14, 15 and 16. All the coils are energized to excite adjacent polar projections for opposite polarity for the N pole position of field switch 9. For the $N \pm S$ pole position of the field switch, coils 11 and 12 of group one are energized so that their polar projections are excited for the same polarities as for the N pole position of the field switch and coil 13 is open circuited; coils 14 and 15 are energized so their polar projections are excited for reversed polarities with respect to their polarities for the N pole position of the field switch and coil 16 is open circuited. In this arrangement, the end coil of each group is not excited for the second or $N \pm S$ pole position of the field switch. The resulting field flux is shown by curve 40, and it also has components having $N+S$ and $N-S$ magnetic poles as shown by curves 26 and 27 in Fig. 1.

The arrangement shown in Fig. 2 requires five slip rings instead of four in order that an end coil of each group may not be excited when the field switch 9 is in the second or $N \pm S$ pole position. For starting the machine as a motor three discharge resistors 41, 42, 43 may be provided, one across coils 11 and 12, one across coils 14 and 15 and one across coils 13 and 16.

The field coils of Fig. 2 may be considered as divided into S groups of coils with N/S coils per group and the end coil of each group not energized for the $N \pm S$ pole position of the field switch. Such field coils may also be considered as divided into S equal groups plus one group of coils S in number whose coils are uniformly distributed between the S equal groups of coils. The one groups of coils is not energized when the field switch is in the $N \pm S$ pole position.

Although but two embodiments of the invention have been shown and described, it will be apparent to those skilled in the art that various changes and modifications may be made within the spirit of the invention and the scope of the appended claims.

It is claimed and desired to secure by Letters Patent:

1. A synchronous dynamoelectric machine comprising an armature and a field structure having N polar projections provided with field coils, a source of excitation current for energizing said coils, said polar projections divided into S groups each consisting of three or more polar projections, N and S being even integers, said coils connected to said source to excite adjacent polar projections of each group for opposite polarities and each end polar projection of one group and the adjacent polar projection of another group for like polarity to produce a field flux having a component corresponding to $N+S$ magnetic poles and a component corresponding to $N-S$ magnetic poles, said armature having a winding arranged for the number of magnetic poles of one of said components.

2. A synchronous dynamoelectric machine comprising an armature and a field structure having N polar projections provided with field coils, a source of excitation current for energizing said coils, said polar projections divided into S groups consisting of equal numbers of adjacent polar projections, N and S being even integers, said coils connected to said source to excite adjacent polar projections of each group for opposite polarities and each end polar projection of one group and the adjacent polar projection of another group for like polarity to produce a field flux having a component corresponding to $N+S$ magnetic poles, said armature having a winding arranged for $N+S$ poles corresponding to the number of magnetic poles of said component.

3. A synchronous dynamoelectric machine comprising a field structure having N polar projections and an armature having a winding arranged for poles in a predetermined number larger than N, said polar projections provided with field coils, a source of excitation current for energizing said coils, means connecting said coils to said source so that said field flux produced thereby has a component which generates a voltage in said armature winding while all other components of said flux generate a negligible voltage in said armature winding, whereby the synchronous speed of said machine is inversely proportional to said predetermined number of poles.

4. In combination, a synchronous dynamoelectric machine comprising an armature having a first winding arranged for $N+S$ poles and a second winding arranged for $N-S$ poles alternately connected, and a field structure having N polar projections provided with field coils, a source of excitation current for energizing said coils, said coils connected to said source so that the magnetic flux produced by the field has a component which generates a voltage in said first winding while all other components of said flux generate a negligible voltage in said first winding, said field flux also having a component which generates a voltage in said second winding while all other components of said flux generate a negligible voltage in said second winding; whereby said dynamoelectric machine operates at one synchronous speed when said first winding of said armature is connected and at another synchronous speed when said second winding of said armature is connected.

5. In combination, a synchronous dynamoelectric machine comprising an armature having windings to be connected alternately for N poles or $N+S$ poles where N and S are even integers, a field structure having N polar projections provided with field coils to be connected to effect alternately N or $N+S$ magnetic poles, a source of excitation for energizing said coils, said coils being divided into S groups, switching means actuable into at least two positions, means connecting said switching means to said source, said switching means when actuated into a first position connect said groups of coils to said source to excite adjacent polar projections for opposite polarity, and said switching means when actuated into a second position connect said groups for coils to said source to excite the polar projections of alternate said groups to reverse their polarity and to excite the polar projections of the intermediate said groups without changing their polarity so that the excited polar projections produce a field flux having a component corresponding to said $N+S$ pole armature.

6. In combination, a synchronous dynamoelectric machine comprising an armature having windings to be connected alternately for N poles or $N-S$ poles where N and S are even integers, a field structure having N polar projections provided with field coils to be connected to effect alternately N or $N-S$ magnetic poles, a source of excitation for energizing said coils, said coils being divided into S groups with each group including three or more coils, switching means actuable into two positions, means connecting said switching means to said source, said switching means when actuated into a first position connect said groups of coils to said source to excite adjacent polar projections for opposite polarity, and said switching means when actuated into a second position connect said groups of coils to said source to excite all the polar projections of alternate said groups to reverse their polarity and to excite all the polar projections of the intermediate said groups without changing their polarity so that the magnetic poles produce a field flux having a component corresponding to said $N-S$ pole armature.

7. In combination, a synchronous dynamoelectric machine comprising an armature having a winding arranged for N poles and a winding arranged for $N+S$ poles, N and S are even integers, a field structure having polar projections provided with field coils to be connected to effect N or $N+S$ magnetic poles, a source of excitation for energizing said coils, said coils being divided into S equal groups of coils plus one group of coils S in number, said coils of said one group uniformly disposed between said S groups of coils, switching means connected to said source, said switching means when actuated into a first position connect all said coils to said source to excite adjacent polar projections for opposite polarity, said switching means when actuated into a second position disconnect said coils of said one group from said source and connect said S groups of coils to said source to excite the polar projections of alternate said S groups to reverse their polarity and to excite the polar projections of the intermediate said S groups without changing their polarity so that the excited polar projections produce a field flux having a component corresponding to said armature when connected for $N+S$ poles.

8. In combination, a synchronous dynamoelectric machine comprising an armature having a winding arranged for N poles and a winding arranged for $N+S$ poles, N and S are even integers, a field structure having N polar projections provided with field coils to be connected to effect N or $N+S$ magnetic poles, a source of excitation for energizing said coils, said coils being divided into S equal groups of coils, switching means connected to said source, said switching means when actuated into a first position connect all said coils to said source to excite adjacent polar projections for opposite polarities, said switching means when actuated into a second position disconnect the last coil of each said group from said source and connect the remaining said coils to said source to excite the polar projections of alternate said groups to reverse their polarities and to excite the polar projections of the intermediate said groups without changing their polarities so that said excited polar projections produce a field flux having a component corresponding to said armature when connected for $N+S$ poles.

9. A synchronous dynamoelectric machine comprising an armature and a field structure having N polar projections provided with field coils, a source of excitation current for energizing said coils, said polar projections divided into S equal groups each consisting of N/S adjacent polar projections where N/S is three or more, N and S being even integers, said source connected to all said coils within each group to excite adjacent polar projections for opposite polarities and an end polar projection of one group and an adjacent end polar projection of another group for like polarities to produce a field flux having a component corresponding to $N+S$ magnetic poles and a component corresponding to $N-S$ magnetic poles, and said armature having a winding arranged for the number of magnetic poles of one of said components.

10. In combination, a synchronous dynamoelectric machine comprising an armature having a first winding arranged for a first number of magnetic poles and a second winding arranged for a second number of magnetic poles, and a field structure having polar projections provided with field coils, a source of excitation current for energizing said coils, means alternately connecting said coils to said source to excite adjacent said polar projections for opposite polarities to form said first number of magnetic poles, and connecting all of said coils to said source in an even number of groups of three or more coils per group to maintain all of the polar projections excited but with reversed polarities for the coils of alternate groups to produce a flux having a component having said second number of magnetic poles and which generates a voltage in said second winding while all other components of said flux generate a negligible voltage in said second winding.

References Cited in the file of this patent

UNITED STATES PATENTS

| | | |
|---|---|---|
| Re. 18,811 | Alger | May 2, 1933 |
| 1,752,871 | Wieseman | Apr. 1, 1930 |
| 2,510,045 | Brainard et al. | May 30, 1950 |